United States Patent
Kim et al.

(10) Patent No.: US 7,728,521 B2
(45) Date of Patent: Jun. 1, 2010

(54) GREEN PHOSPHOR FOR PLASMA DISPLAY PANEL AND PLASMA DISPLAY PANEL INCLUDING A PHOSPHOR LAYER FORMED OF THE SAME

(75) Inventors: Young-Kwan Kim, Suwon-si (KR); Teruo Kurai, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 263 days.

(21) Appl. No.: 11/977,652

(22) Filed: Oct. 25, 2007

(65) Prior Publication Data
US 2008/0100219 A1 May 1, 2008

(30) Foreign Application Priority Data
Oct. 31, 2006 (KR) .................... 10-2006-0106713

(51) Int. Cl.
*H01J 17/49* (2006.01)
(52) U.S. Cl. .................... 313/582; 252/301.4 R
(58) Field of Classification Search ......... 313/582–587; 252/301.4 F, 301.4 R
See application file for complete search history.

(56) References Cited

U.S. PATENT DOCUMENTS

| | | | | |
|---|---|---|---|---|
| 5,182,489 | A | * | 1/1993 | Sano .................... 313/485 |
| 2004/0075386 | A1 | * | 4/2004 | Hoshino et al. ......... 313/582 |
| 2007/0024195 | A1 | * | 2/2007 | Kim ...................... 313/582 |

* cited by examiner

*Primary Examiner*—Joseph L Williams
*Assistant Examiner*—Hana A Sanei
(74) *Attorney, Agent, or Firm*—Knobbe Martens Olson & Bear LLP

(57) ABSTRACT

Provided is a green phosphor for a plasma display panel (PDP) represented by Formula 1.

$$(Ca_x, Mg_y, Zn_{2-x-y})SiO_4:Mn \qquad \text{Formula 1}$$

Here, $0<x, y<1$.

The green phosphor is used alone or in combination with $BaMgAl_qO_z:Mn$ ($7<q<15$ and $12<z<28$) to prepare a phosphor layer, and a PDP including a phosphor layer formed of the green phosphor may have improved luminance deterioration property.

17 Claims, 1 Drawing Sheet

GREEN PHOSPHOR FOR PLASMA DISPLAY PANEL AND PLASMA DISPLAY PANEL INCLUDING A PHOSPHOR LAYER FORMED OF THE SAME

CROSS-REFERENCE TO RELATED PATENT APPLICATION

This application claims the benefit of Korean Patent Application No. 10-2006-0106713, filed on Oct. 31, 2006, in the Korean Intellectual Property Office, the disclosure of which is incorporated herein in its entirety by reference.

BACKGROUND OF THE INVENTION

1. Field of the Invention

The present embodiments relate to a green phosphor for a plasma display panel (PDP) and a PDP including a phosphor layer formed of the green phosphor, and to a green phosphor for a PDP having improved luminance deterioration properties, a method of manufacturing a PDP employing the green phosphor, and a PDP including a phosphor layer formed of the green phosphor.

2. Description of the Related Art

Phosphors emit light when they are exposed to energy. In general, phosphors are used in light sources such as mercury fluorescent lamps and mercury free fluorescent lamps, electron emission devices, plasma display panels (PDP), etc. In the futures, phosphors will likely be used for a wider range of applications as new multimedia devices are developed.

PDPs are flat panel displays that display images using light emitted by ultraviolet rays that are created by discharge of a mixture of gases including neon and xenon injected into an area between a pair of substrates. Visible light is created by each phosphor using resonance radiation light of xenon ion (147 nm vacuum ultraviolet rays).

Phosphors used in PDPs are required to have excellent discharge properties, high emission luminance, excellent color coordinates, and short decay time. In PDPs, the composition of a material formed of a phosphor layer varies according to the phosphor layer, that is red, green and blue phosphor layer. Luminance deterioration in phosphors needs to be prevented since it may shorten the lifetime of PDPs with phosphor layers formed of the phosphor.

The most serious luminance deterioration occurs in $BaMgAl_{10}O_{17}$:Eu blue phosphor among the phosphors generally used in PDPs. Thus, the degree of luminance deterioration of the blue phosphor often determines the lifetime of PDPs. As a result of an effort to overcome such luminance deterioration, a novel blue phosphor of CaMgSiO:Eu has been developed. CaMgSiO:Eu phosphor has a base structure of $SiO_2$ in which Ca and Mg are substituted.

Meanwhile, Mn is considered to be used as an activator instead of Eu in the CaMgSiO:Eu phosphor. However, the CaMgSiO:Eu phosphor using Mn instead of Eu emits not red light but green light. Thus, a green phosphor having improved luminance deterioration property and long lifetime is urgently required.

SUMMARY OF THE INVENTION

The present embodiments provide a green phosphor for a plasma display panel (PDP) having improved luminance deterioration property.

The present embodiments also provide a method of manufacturing a PDP including a phosphor layer formed of the green phosphor which had improved luminance deterioration property and long lifetime.

The present embodiments also provide a PDP including a phosphor layer formed of the green phosphor which had improved luminance deterioration property and long lifetime.

According to an aspect of the present embodiments, there is provided a green phosphor for a PDP represented by Formula 1.

$$(Ca_x,Mg_y,Zn_{2-x-y})SiO_4:Mn \qquad \text{Formula 1}$$

Here, 0<x, y<1.

According to another aspect of the present embodiments, there is provided a green phosphor for a PDP including a phosphor represented by Formula 1; and a phosphor represented by Formula 2.

$$(Ca_x,Mg_y,Zn_{2-x-y})SiO_4:Mn \qquad \text{Formula 1}$$

$$BaMgAl_qO_z:Mn \qquad \text{Formula 2}$$

Here, 0<x, y<1; 7<q<15; and 12<z<28.

According to another aspect of the present embodiments, there is provided a method of manufacturing a PDP including: forming a plurality of discharge cells between a front pane and a rear panel that are parallel to each other; and printing, drying and sintering a paste composition including the green phosphor according to some embodiments, a solvent, and a resin binder in each of the discharge cells to form a green phosphor layer.

According to another aspect of the present embodiments, there is provided a PDP including: a transparent front substrate; a rear substrate which is parallel to the transparent front substrate; emission cells divided by barrier ribs interposed between the transparent front substrate and the rear substrate; pairs of sustain electrodes extending in a first direction to correspond to the emission cells; address electrodes extending in a second direction to cross the sustain electrodes and correspond to the emission cells; a rear dielectric layer covering the address electrodes; red, green, and blue phosphor layers disposed inside the discharge cells; a front dielectric layer covering the pairs of sustain electrodes; and a discharge gas inside the emission cells, wherein the green phosphor layer is formed of a green phosphor according to the present embodiments.

BRIEF DESCRIPTION OF THE DRAWINGS

The above and other features and advantages of the present embodiments will become more apparent by describing in detail exemplary embodiments thereof with reference to the attached drawing in which.

DETAILED DESCRIPTION OF THE INVENTION

Figure 1:
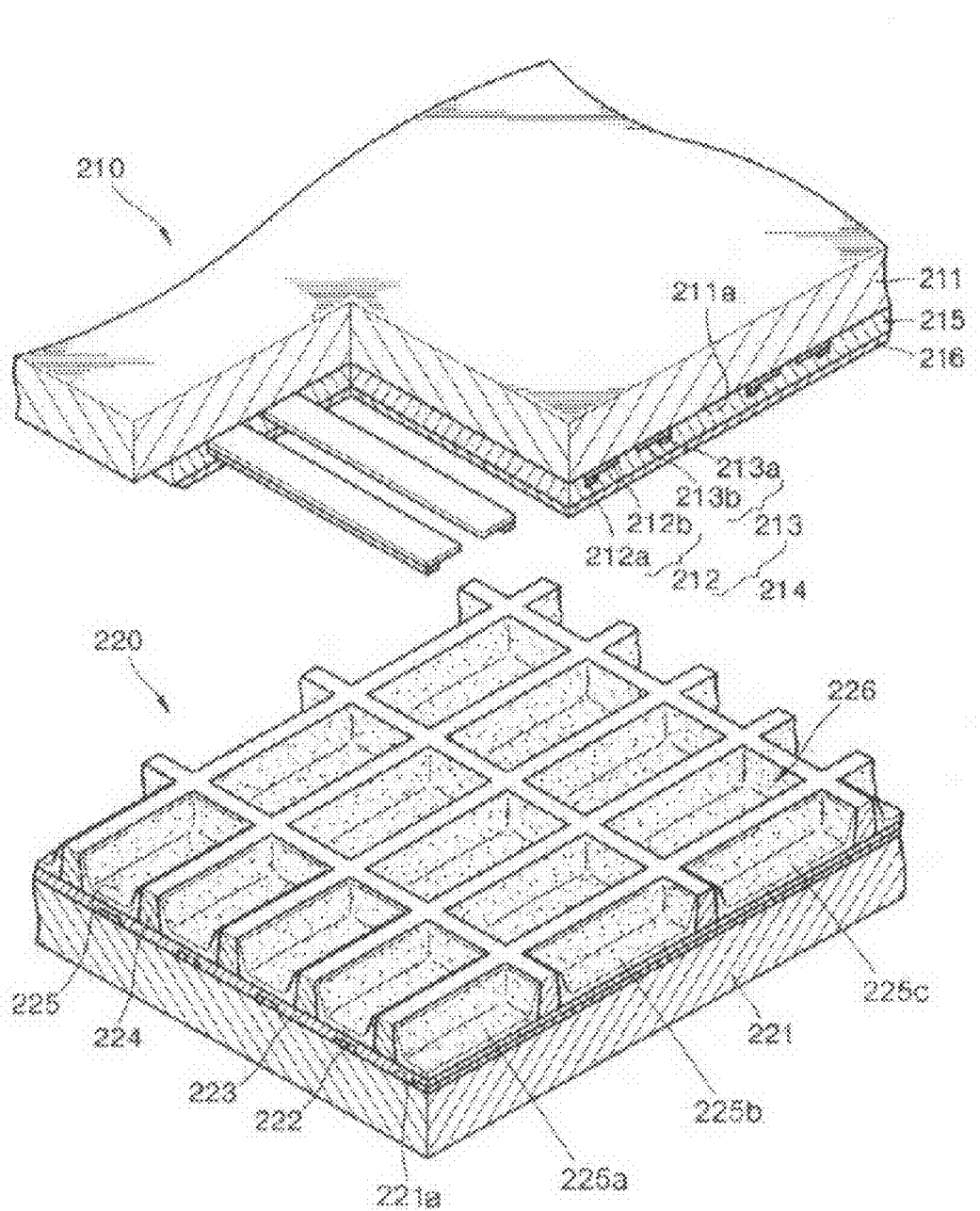
FIG. 1 is a perspective view illustrating a plasma display panel (PDP) according to an embodiment.

The present embodiments will now be described more fully with reference to the accompanying drawing. A green phosphor of a plasma display panel (PDP) according to an embodiment is represented by Formula 1.

$$(Ca_x,Mg_y,Zn_{2-x-y})SiO_4:Mn \qquad \text{Formula 1}$$

wherein, 0<x and y<1.

The amount of Ca and Mg may be from about 0.1 to about 5 mol % based on 100 mol % of the green phosphor.

The ratio of Ca to Mg may be from about 1:1 to about 1:9.

The $Zn_2SiO_4$:Mn phosphor has been commonly used for a phosphor for a PDP and has excellent luminance and color purity. However, such a phosphor has serious luminance deterioration as a result of ion collision compared to other green phosphors, and the luminance deterioration is more serious when Xe and He gases are used.

The $Zn_2SiO_4$:Mn phosphor has a Willemite structure in which each of the Zn and Si is surrounded by 4 oxygen atoms and thus the structure becomes a slightly transformed regular tetrahedron structure having Zn or Si in the center. Zn is substituted with Mn which is an activator. A regular tetrahedron structure having Zn in the center is relatively weak compared to that having Si in the center; therefore, the structure may become easily transformed by an external environmental change. Thus, the luminance may be deteriorated by ion collisions in $Zn_2SiO_4$:Mn phosphors.

In order to improve luminance deterioration property, a partial Zn of $Zn_2SiO_4$:Mn is substituted with a small amount of Ca and Mg. The substituted Ca and Mg strengthen the structure of the green phosphor compared to the structure having only Zn.

The amount of Ca and Mg is from about 0.1 to about 5 mol % based on 100 mol % of the green phosphor. In this range of amount, the substitution of Ca and Mg exhibits excellent effect without deforming the structure of the phosphor.

Mn may be used as an activator for the green phosphor according to the current embodiment. The amount of Mn may be from about 0.1 to about 27 mol %, and preferably from about 1 to about 15 mol %. In this range of amount, the green phosphor exhibits excellent luminance. Theoretically, luminance increases as the amount of the activator increases, but an excess of the activator may reduce luminance in the process of exchanging electrons or light between the activators.

According to another embodiment, there is provided a green phosphor for a PDP including a phosphor represented by Formula 1 and a phosphor represented by Formula 2.

$(Ca_x,Mg_y,Zn_{2-x-y})SiO_4$:Mn    Formula 1

$BaMgAl_qO_z$:Mn    Formula 2

Here, $0<x$, $y<1$; $7<q<15$; and $12<z<28$.

In the current embodiment, $(Ca_x,Mg_y,Zn_{2-x-y})SiO_4$:Mn which is a main phosphor may be mixed with $BaMgAl_qO_z$:Mn to produce a green phosphor for a PDP having improved properties in luminance deterioration, decay time and/or lifetime.

The amount of the phosphor of Formula 1 may be from about 50 to about 100 wt % based on the total amount of the green phosphor.

The amount of the Ca and Mg may be from about 0.1 to about 5 mol % based on 100 mol % of the green phosphor. In this range of amount, the substitution of Ca and Mg exhibits excellent effect without deforming the structure of the phosphor.

The green phosphor may further include a phosphor having Tb as an activator in addition to $BaMgAl_qO_z$:Mn, such as $Y_2SiO_4$:Tb and $YAl_3(BO_3)_4$:Tb.

According to another embodiment, there is provided a method of manufacturing a PDP including: forming a plurality of discharge cells between a front panel and a rear panel that are parallel to each other; and printing, drying and sintering a paste composition including the green phosphor according to embodiments, a solvent, and a resin binder in each of the discharge cells to form a green phosphor layer.

A $(Ca_x, Mg_y, Zn_{2-x-y})SiO_4$ phosphor according to the present embodiments alone or in combination with a $BaMgAl_qO_z$:Mn phosphor may be mixed with a binder, an organic solvent, etc. to obtain a paste composition, and then the paste composition is printed, dried and sintered to form a phosphor layer.

A PDP of the current embodiment includes: a transparent front substrate; a rear substrate which is parallel to the transparent front substrate; emission cells divided by barrier ribs disposed between the transparent front substrate and the rear substrate; address electrodes extending along emission cells; a rear dielectric layer covering the address electrodes; red, green, and blue phosphor layers disposed inside the emission cells; pairs of sustain electrodes extending in a direction crossing the direction in which the address electrodes extend; a front dielectric layer covering the pairs of sustain electrodes; and a discharge gas inside the emission cells, wherein the green phosphor layer is formed of a phosphor represented by Formula 1.

$(Ca_x,Mg_y,Zn_{2-x-y})SiO_4$:Mn    Formula 1 wherein, $0<x$, $y<1$.

A PDP of the current embodiment includes: a transparent front substrate; a rear substrate which is parallel to the transparent front substrate; emission cells divided by barrier ribs interposed between the transparent front substrate and the rear substrate; pairs of sustain electrodes extending in a first direction to correspond to the emission cells; address electrodes extending in a second direction to cross the sustain electrodes and correspond to the emission cells; a rear dielectric layer covering the address electrodes; red, green, and blue phosphor layers disposed inside the discharge cells; a front dielectric layer covering the pairs of sustain electrodes; and a discharge gas inside the emission cells, wherein the green phosphor layer includes a phosphor represented by Formula 1 and a phosphor represented by Formula 2.

$(Ca_x,Mg_y,Zn_{2-x-y})SiO_4$:Mn    Formula 1

$BaMgAl_qO_z$:Mn    Formula 2

Here, $0<x$, $y<1$; $7<q<15$; and $12<z<28$.

Hereinafter, a PDP including a phosphor layer formed of a phosphor according to the present embodiments will be descried with reference to FIG. 1.

The PDP includes a front panel 210 and a rear panel 220. The front panel 210 includes a front substrate 211, pairs of sustain electrodes 214 that are disposed on a rear surface of the front substrate 211 and extend in a first direction to correspond to emission cells 226, a front dielectric layer covering the pairs of sustain electrodes, and a protective layer 216.

The rear panel 220 includes a rear substrate 221 which is parallel to the front substrate 211, address electrodes 222 that are disposed on a front surface 221a of the rear substrate 221 and extend in a second direction crossing the sustain electrode, a rear dielectric layer 223 covering the address electrodes 222, barrier ribs 224 that divide the emission cells 226 and are disposed between the front substrate 211 and the rear substrate 221, and more particularly on the rear dielectric layer 223, and a red phosphor layer 225a, a green phosphor layer 225b, and a blue phosphor layer 225c respectively formed of red, green, and blue phosphor that emit visible lights by being excited by ultraviolet rays emitted from a discharge gas generated due to sustain discharges occurring inside the barrier ribs.

The green phosphor layer 225b according to an embodiment may be prepared using a phosphor including $(Ca_x, Mg_y, Zn_{2-x-y})SiO_4$. To easily print the phosphor according to the current embodiment, the phosphor can be mixed with a binder and a solvent to obtain a paste phase composition, and then the paste phase composition can be used to screen print using a screen mesh. Then, the printed composition is dried and sintered to form a phosphor layer. The drying temperature of the printed composition may be from about 100° C. to about 150° C., and the sintering temperature may be from about 350° C. to about 600° C., preferably about 450° C., to remove organic materials of the paste phase composition. The binder can be, for example, ethyl cellulose or acrylic resin, and the amount of the binder may be from about 10 to about 30 parts by weight based on 100 parts by weight of the phosphor.

The solvent can be, for example, butyl carbitol (BCA) or terpineol, and the amount of the solvent may be from about 70 to about 300 parts by weight based on 100 parts by weight of the phosphor.

The viscosity of the paste phase composition may be from about 5,000 to about 50,000 cps, and preferably about 20,000 cps.

The composition according to the current embodiment can further includes additives such as a dispersant, a plasticizer, an antioxidant, a leveler or the like. In addition, all of the above additives are known to those of ordinary skill in the art and commercially available. The amount of the additives may be from about 0.1 to about 10 parts by weight based on a total amount of the composition.

The green phosphor layer $225b$ according to another embodiment may be prepared using a phosphor including $(Ca_x, Mg_y, Zn_{2-x-y})SiO_4:Mn$, and the red phosphor layer and the blue phosphor layer can be any red and blue phosphor layers.

The front substrate 211 and the rear substrate 221 can be formed of glass, for example. The front substrate 211 may have high light transmittance.

The address electrodes 222 which are disposed on the front surface $221a$ of the rear substrate 221 and extend in the second direction to correspond to the emission cells 226 may be formed of a metal having high electrical conductivity, such as Al. The address electrodes 222 are used together with a Y electrode 212 for an address discharge to occur. The address discharge is a discharge occurring in order to select some emission cells 226 that are to emit light. In the emission cells 226, where address discharges have occurred, a sustain discharge, which will be described in detail, can occur.

The address electrodes 222 are covered by the rear dielectric layer 223, which prevents collision of the address electrodes 222 with charged particles that are generated during the address discharge, so that the address electrodes 222 can be protected. The rear dielectric layer 223 may be formed of a dielectric capable of inducing discharged particles. The dielectric can be, for example, $PbO$, $B_2O_3$, $SiO_2$, etc.

The barrier ribs 224 dividing the emission cells 226 are interposed between the front substrate 211 and the rear substrate 221. The barrier ribs 224 secure a discharge space between the front substrate 211 and the rear substrate 221, prevent crosstalk between adjacent emission cells 226, and enlarge the surface area of the phosphor layer 225. The barrier ribs 224 may be formed of a glass material including Pb, B, Si, Al, or O, and when required, the barrier ribs 224 may further include a filler such as $ZrO_2$, $TiO_2$, and $Al_2O_3$, and a pigment such as Cr, Cu, Co, Fe, or $TiO_2$.

The pair of sustain electrodes 214 extend along the emission cells 226, in a direction crossing the direction in which the address electrodes 222 extend. The pair of sustain electrodes 214 include a pair of sustain electrodes 212 and 213. The pair of sustain electrodes 214 are disposed parallel to each other at predetermined intervals on the front substrate 211. One of the sustain electrodes 212 is an X electrode 213 and the other one is a Y electrode 212. The sustain discharge occurs due to a potential difference between the X electrode 213 and the Y electrode 212.

The X electrode 213 and the Y electrode 212 include transparent electrodes $213b$ and $212b$ and bus electrodes $213a$ and $212a$, respectively. In some cases, however, the bus electrodes $213a$ and $212a$ can be solely used to form a scanning electrode and a common electrode.

The transparent electrodes $213b$ and $212b$ may be formed of a conductive and transparent material, so that the light emitted from the phosphor can proceed forward towards the front substrate 211 without being blocked. The conductive and transparent material can be indium tin oxide (ITO). However, since the conductive and transparent material, such as ITO, has a high resistance, and when the sustain electrodes 214 are only formed of the transparent electrodes $213b$ and $212b$, the sustain electrodes 214 have a large voltage drop in a lengthwise direction of the transparent electrodes $213b$ and $212b$, the power consumption of a PDP increases and a response speed of images reduces. In order to prevent these problems, the bus electrodes $213a$ and $212a$ are formed of a highly conductive metal, such as Ag, and are formed on external ends of the transparent electrodes $213b$ and $212b$.

The sustain electrodes 212 and 213 are covered by the front dielectric layer 215. The front dielectric layer 215 prevents a direct electrical connection of the X electrode 213 and Y electrode 212 that is adjacent to the X electrode 213, and prevents collisions of charged particles with the sustain electrodes 212 and 213, so that the sustain electrodes are protected. The front dielectric layer 215 is formed of a dielectric having high light transmittance, such as $PbO$, $B_2O_3$, and $SiO_2$.

The protective layer 216 can be formed on the front dielectric layer 215. The protective layer 216 prevents collisions of charged particles with the front dielectric layer 215 during the sustain discharge so that the front dielectric layer 215 can be protected, and generates many secondary electrons during the sustain discharge. The protective layer 216 may be formed of MgO.

The inside of the emission cells 226 is filled with a discharge gas. The discharge gas can be, for example a gaseous mixture of Ne and Xe in which the amount of Xe is from about 5% to about 10%. Also, a part of Ne can be replaced with He.

The present embodiments will be described in further detail with reference to the following examples. These examples are for illustrative purposes only and are not intended to limit the scope of the present embodiments.

EXAMPLES

Example 1

100 wt % of $(Ca, Mg, Zn)SiO_4:Mn$ in which the amount of Ca and Mg was 0.5 mol %, the ratio of Ca to Mg is 1:1, and the amount of Mn was 10 mol % was mixed with butyl carbitol acetate and ethyl cellulose. The mixture was mixed with a vehicle to prepare a paste composition. The paste composition was printed on barrier ribs of a plasma display panel to prepare a green phosphor layer.

Example 2

The experiment was performed in the same manner as in Example 1, except that the amount of Ca and Mg was 1.0 mol %.

Example 3

The experiment was performed in the same manner as in Example 1, except that the amount of Ca and Mg was 2.0 mol %.

Example 4

The experiment was performed in the same manner as in Example 1, except that the amount of Ca and Mg was 3.0 mol %.

Example 5

The experiment was performed in the same manner as in Example 1, except that the amount of Ca and Mg was 4.0 mol %.

Example 6

The experiment was performed in the same manner as in Example 1, except that the amount of Ca and Mg was 5.0 mol %.

Comparative Example 1

The experiment was performed in the same manner as in Example 1, except that 100 wt % of $Zn_2SiO_4$:Mn was used.

The results according to Examples 1 to 6 and Comparative Example 1 are shown in Table 1.

TABLE 1

| | The amount of Ca and Mg (%) | Accelerated lifetime (500 hours) |
|---|---|---|
| Example 1 | 0.5 | 78 |
| Example 2 | 1.0 | 79 |
| Example 3 | 2.0 | 82 |
| Example 4 | 3.0 | 84 |
| Example 5 | 4.0 | 86 |
| Example 6 | 5.0 | 87 |
| Comparative Example 1 | 0 | 78 |

As shown in Table 1, a phosphor layer according to Examples 1 to Example 6 had the lower degree of luminance deterioration and longer lifetime compared to a phosphor using 100 wt % of $Zn_2SiO_4$:Mn according to Comparative Example 1.

A PDP including a phosphor layer formed of a green phosphor of the present embodiments may have improved properties in luminance deterioration and lifetime by using either $(Ca_x,Mg_y,Zn_{2-x-y})SiO_4$:Mn alone or $(Ca_x,Mg_y,Zn_{2-x-y})SiO_4$:Mn in combination with $BaMgAl_qO_z$:Mn.

While the present embodiments have been particularly shown and described with reference to exemplary embodiments thereof, it will be understood by those of ordinary skill in the art that various changes in form and details may be made therein without departing from the spirit and scope of the present embodiments as defined by the following claims.

What is claimed is:

1. A green phosphor for a plasma display panel represented by Formula 1:

$(Ca_x,Mg_y,Zn_{2-x-y})SiO_4$:Mn   Formula 1 wherein 0<x and y<1.

2. The green phosphor of claim 1, wherein the amount of Ca and Mg is from about 0.1 to about 5 mol % based on 100 mol % of the green phosphor.

3. A plasma display panel comprising: a transparent front substrate; a rear substrate which is parallel to the transparent front substrate; emission cells divided by barrier ribs interposed between the transparent front substrate and the rear substrate; pairs of sustain electrodes extending in a first direction configured to correspond to the emission cells; address electrodes extending in a second direction to cross the sustain electrodes and correspond to the emission cells; a rear dielectric layer covering the address electrodes; red, green, and blue phosphor layers disposed inside the discharge cells; a front dielectric layer covering the pairs of sustain electrodes; and a discharge gas inside the emission cells, wherein the green phosphor layer is formed of the green phosphor of claim 2.

4. The green phosphor of claim 1, wherein the ratio of Ca to Mg is from about 1:1 to about 1:9.

5. A plasma display panel comprising: a transparent front substrate; a rear substrate which is parallel to the transparent front substrate; emission cells divided by barrier ribs interposed between the transparent front substrate and the rear substrate; pairs of sustain electrodes extending in a first direction configured to correspond to the emission cells; address electrodes extending in a second direction to cross the sustain electrodes and correspond to the emission cells; a rear dielectric layer covering the address electrodes; red, green, and blue phosphor layers disposed inside the discharge cells; a front dielectric layer covering the pairs of sustain electrodes; and a discharge gas inside the emission cells, wherein the green phosphor layer is formed of the green phosphor of claim 4.

6. The green phosphor of claim 1, further comprising a phosphor having Tb as an activator.

7. A plasma display panel comprising: a transparent front substrate; a rear substrate which is parallel to the transparent front substrate; emission cells divided by barrier ribs interposed between the transparent front substrate and the rear substrate; pairs of sustain electrodes extending in a first direction configured to correspond to the emission cells; address electrodes extending in a second direction to cross the sustain electrodes and correspond to the emission cells; a rear dielectric layer covering the address electrodes; red, green, and blue phosphor layers disposed inside the discharge cells; a front dielectric layer covering the pairs of sustain electrodes; and a discharge gas inside the emission cells, wherein the green phosphor layer is formed of the green phosphor of claim 1.

8. The plasma display panel of claim 7, wherein the thickness of the phosphor layer is from about 5 to about 50 µm.

9. A green phosphor for a plasma display panel comprising:
a phosphor represented by Formula 1; and
a phosphor represented by Formula 2:

$(Ca_x,Mg_y,Zn_{2-x-y})SiO_4$:Mn   Formula 1

$BaMgAl_qO_z$:Mn   Formula 2 wherein 0<x, y<1, 7<q<15 and 12<z<28.

10. The green phosphor of claim 9, wherein the amount of the phosphor represented by Formula 1 is from about 50 to about 100 wt % based on the total amount of the green phosphor.

11. A plasma display panel comprising: a transparent front substrate; a rear substrate which is parallel to the transparent front substrate; emission cells divided by barrier ribs interposed between the transparent front substrate and the rear substrate; pairs of sustain electrodes extending in a first direction to correspond to the emission cells; address electrodes extending in a second direction to cross the sustain electrodes and correspond to the emission cells; a rear dielectric layer covering the address electrodes; red, green, and blue phosphor layers disposed inside the discharge cells; a front dielectric layer covering the pairs of sustain electrodes; and a discharge gas inside the emission cells, wherein the green phosphor layer is formed of the green phosphor of claim 10.

12. The green phosphor of claim 9, wherein the amount of the Ca and Mg is from about 0.1 to about 5 mol % based on 100 mol % of the green phosphor.

13. A plasma display panel comprising: a transparent front substrate; a rear substrate which is parallel to the transparent front substrate; emission cells divided by barrier ribs interposed between the transparent front substrate and the rear substrate; pairs of sustain electrodes extending in a first direction to correspond to the emission cells; address electrodes extending in a second direction to cross the sustain electrodes and correspond to the emission cells; a rear dielectric layer covering the address electrodes; red, green, and blue phosphor layers disposed inside the discharge cells; a front dielectric layer covering the pairs of sustain electrodes; and a discharge gas inside the emission cells, wherein the green phosphor layer is formed of the green phosphor of claim 12.

14. The green phosphor of claim 9, wherein the ratio of Ca to Mg is from about 1:1 to about 1:9.

15. A plasma display panel comprising: a transparent front substrate; a rear substrate which is parallel to the transparent front substrate; emission cells divided by barrier ribs interposed between the transparent front substrate and the rear substrate; pairs of sustain electrodes extending in a first direction to correspond to the emission cells; address electrodes extending in a second direction to cross the sustain electrodes and correspond to the emission cells; a rear dielectric layer covering the address electrodes; red, green, and blue phosphor layers disposed inside the discharge cells; a front dielectric layer covering the pairs of sustain electrodes; and a discharge gas inside the emission cells, wherein the green phosphor layer is formed of the green phosphor of claim 14.

16. A plasma display panel comprising: a transparent front substrate; a rear substrate which is parallel to the transparent front substrate; emission cells divided by barrier ribs interposed between the transparent front substrate and the rear substrate; pairs of sustain electrodes extending in a first direction to correspond to the emission cells; address electrodes extending in a second direction to cross the sustain electrodes and correspond to the emission cells; a rear dielectric layer covering the address electrodes; red, green, and blue phosphor layers disposed inside the discharge cells; a front dielectric layer covering the pairs of sustain electrodes; and a discharge gas inside the emission cells, wherein the green phosphor layer is formed of the green phosphor of claim 9.

17. The plasma display panel of claim 16, wherein the thickness of the phosphor layer is from about 5 to about 50 μm.

* * * * *